US006930881B2

United States Patent
Karidis et al.

(10) Patent No.: US 6,930,881 B2
(45) Date of Patent: Aug. 16, 2005

(54) PORTABLE COMPUTER HAVING A SPLIT SCREEN AND A MULTI-PURPOSE HINGE

(75) Inventors: John Peter Karidis, Ossining, NY (US); Susan Somers Moffatt, Chapel Hill, NC (US); Gerard Francis Muenkel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 10/610,020

(22) Filed: Jun. 30, 2003

(65) Prior Publication Data

US 2004/0264118 A1 Dec. 30, 2004

(51) Int. Cl.⁷ .............................................. G06F 1/16
(52) U.S. Cl. ...................... 361/683; 361/681; 16/286; 248/161
(58) Field of Search ................................ 361/683, 681; 248/120, 121, 917–923; 16/285–287, 291–295

(56) References Cited

U.S. PATENT DOCUMENTS

| | | | |
|---|---|---|---|
| 1,757,075 A | * 5/1930 | Earhart | ........................ 16/371 |
| 5,251,102 A | * 10/1993 | Kimble | ........................ 361/683 |
| 5,687,939 A | 11/1997 | Moscovitch | |
| 5,768,096 A | 6/1998 | Williams et al. | |
| 5,847,698 A | 12/1998 | Reavey et al. | |
| 5,871,094 A | * 2/1999 | Leibowitz | ................... 206/320 |
| 5,949,643 A | 9/1999 | Batio | |
| 5,969,696 A | 10/1999 | Stoye | |
| 6,081,207 A | 6/2000 | Batio | |
| 6,088,220 A | 7/2000 | Katz | |
| 6,094,341 A | 7/2000 | Lin | |
| 6,144,358 A | 11/2000 | Narayanaswamy et al. | |
| 6,262,785 B1 | 7/2001 | Kim | |
| 6,297,945 B1 | 10/2001 | Yamamoto | |
| 6,302,612 B1 | 10/2001 | Fowler et al. | |
| 6,430,308 B1 | * 8/2002 | Ogawa et al. | ............. 382/119 |
| 6,437,973 B1 | * 8/2002 | Helot et al. | ................. 361/681 |
| 6,460,221 B1 | * 10/2002 | Eromaki | ...................... 16/286 |
| 6,567,263 B2 | * 5/2003 | Lai et al. | ..................... 361/683 |
| 6,654,234 B2 | * 11/2003 | Landry et al. | ............. 361/681 |

* cited by examiner

Primary Examiner—Lisa Lea-Edmonds
(74) Attorney, Agent, or Firm—Ronald V. Davidge (57) ABSTRACT

A portable computer includes upper and lower sections that are pivotally attached, together with a hinge assembly extending outwardly from the pivoted edges of the section. When the upper and lower sections are pivoted open, the hinge assembly moves outward and downward to form a handle by which the computer is easily held and a stand for convenient placement of the computer on a horizontal surface.

18 Claims, 5 Drawing Sheets

PORTABLE COMPUTER HAVING A SPLIT SCREEN AND A MULTI-PURPOSE HINGE

BACKGROUND OF THE INVENTION

1. Field of the Invention

This invention relates to a portable computer configuration, and, more particularly to a device forming a handle for holding a portable computer, a support for resting the portable computer on a horizontal surface when the portable computer is opened, and additionally a shield covering a flexible cable extending between movable portions of the portable computer.

2. Summary of the Background Art

A number of patents describe portable computers and other small devices that are folded for carrying or storage and that are opened partly or totally into a flat condition for use without providing a means to hold the devices at a convenient angle on a horizontal surface and without providing a handle means for easily holding the devices without partly covering their display screens or controls, For example, U.S. Pat. No. 5,847,698 describes an electronic book device having an electronic display unit with a flat panel screen and a housing for containing the flat panel screen. The device includes a lower section including a display screen and a number of control buttons, and an upper section, which is hingedly mounted at the rear edge of the upper section. In some versions, the upper section includes a second display screen. The upper section is pivoted between a closed condition, in which the upper section lies against the lower section, and an open condition, in which the device is opened for viewing the screen(s). To further enhance the book-like feel, the device has a book-like cover that can be embellished with various designs and graphics corresponding to a subject area of interest.

U.S. Pat. No. 6,262,785 describes a portable display device including a main body and an extension portion connected to the main body so that the extension portion can be folded over and spread apart from the main body. The main body includes means for inputting data, with display means being provided in both the main body and the extension portion.

U.S. Pat. No. 6,144,358 describes a portable electronic device that has two or more display screens that can be used to display different subsets of image signals. The device has an open or active configuration, in which the multiple screens are available for displaying image signals, and a closed or inactive configuration, in which some or all of the multiple screens are folded together or otherwise stowed away to reduce the size of the device for storage and/or carrying.

U.S. Pat. No. 6,297,945 describes portable electronic terminal apparatus including a main body, an information input mechanism, a plurality of displays, a communications mechanism, and a flip panel, on which one of the display panels is mounted.

U.S. Pat. No. 6,088,220 describes a folding pocket-sized computer including a folding 12-inch screen divided into four sections and a keyboard divided into two sections.

In the devices of the patents described above, what is needed is a handle for holding each small device without partially covering its display screens or controls with the hand holding the device. Additionally, what is needed is a means deploying to hold the device at a convenient angle on a horizontal surface, such as a tabletop.

U.S. Pat. No. 6,081,207 describes a relatively large device, in the form of a notebook computer, having a folding, portable keyboard and a dual split screen, with each half of the split screen being pivotally mounted on the keyboard. The keyboard has four double, adjustable feet that can be folded downward to provide for resting the device at a desired angle on a horizontal surface. Since the device is relatively large, it doe not appear likely to be able in a single hand. Still, what is needed is a means providing for resting the device at an appropriate angle, with the means being automatically deployed as the device is opened for use.

U.S. Pat. No. 6,302,612 describes an interface apparatus including a base element, an interface element, and an attachment mechanism for attaching the interface element to the base element. The attachment mechanism is pivotable within a plurality of degrees of freedom. The interface element is an extensible member, which is, in two of its embodiments, pivotally mounted so as to be rotatably adjustable about a pivot point with respect to a primary member. The primary member may be a base member or another display member. These members may be computer keyboards or displays, such as liquid crystal displays (LCDs), audio speakers, or the like such as are used in desktop or laptop computers and terminals.

U.S. Pat. No. 5,969,696 describes an interface for a computer system that can drive several different display systems. The interface of the present invention consists of power signals, ground signals, sense signals, programmable signals, and a few miscellaneous signals. The sense signals are driven by each display system that is designed to operate with the interface of the present invention. Each display system drives the sense signals with a code that uniquely identifies the display system. The interface is selfconfiguring such that the computer system reads the unique code output on the sense signals and correspondingly outputs the proper display information on the programmable signals to drive the display system connected to the interface.

SUMMARY OF THE INVENTION

According to a first aspect of the invention a portable computer is provided, including upper and lower sections and upper and lower outer brackets. The upper section is pivotally mounted on the lower section about a first pivot axis extending along the portable computer adjacent a lower rear edge of the upper section to be pivotable between a closed position, in which the upper section extends adjacent and above the lower section, and an open position, in which the upper section extends away from the lower section. The upper outer bracket is pivotally mounted on the upper section to extend along an upper surface of the upper section and to extend downward along a rear surface of the upper section with the upper section in the closed position. The lower outer bracket is pivotally mounted on the lower section to extend along a lower surface of the lower section and to extend upward along a rear surface of the lower section with the upper section in the closed position. The lower outer bracket is additionally pivotally mounted to the upper outer bracket.

According to another aspect of the invention, a hinge assembly is provided for pivotally connecting upper and lower sections of a portable computer. The hinge assembly includes upper and lower mounting brackets and upper and lower outer brackets. The upper mounting bracket, which is for attachment to the upper section, extends forward to form a portion of a hinge along an upper pivot axis and downward to form a portion of a hinge along an inner pivot axis. The lower mounting bracket, which is for attachment to the lower section, extends forward to form a portion of a hinge along a lower pivot axis and upward to form a portion of a hinge along the inner pivot axis. The upper outer bracket extends, outwardly from the upper mounting bracket, forward to form a portion of the hinge along the upper pivot axis and downward to form a portion of a hinge along an outer pivot axis. The lower outer bracket extends outwardly from the lower mounting bracket, forward to form a portion of the hinge along the lower pivot axis and upward to form a portion of the hinge along the outer pivot axis. All the pivot axes are parallel. The hinge assembly also includes pivot pins extending within the hinges along the inner, upper, and lower pivot axes.

DETAILED DESCRIPTION OF THE INVENTION

Figure 1:
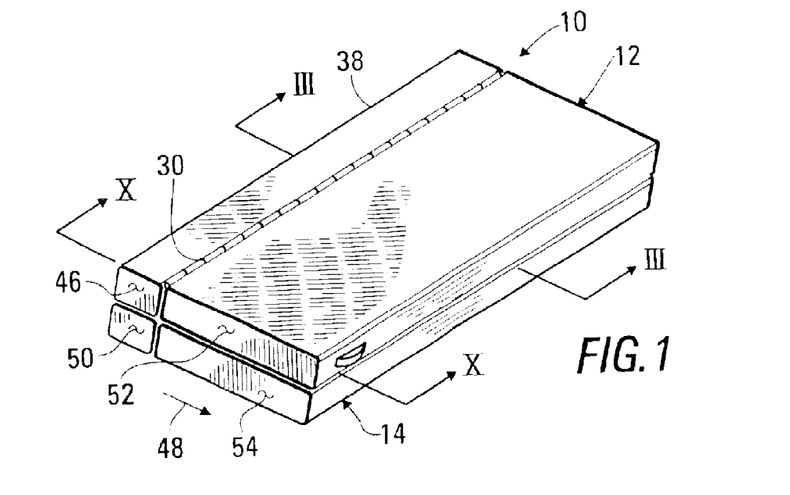
FIG. 1 is a perspective view of a portable computer built in accordance with the present invention in a closed condition.
Figure 2:
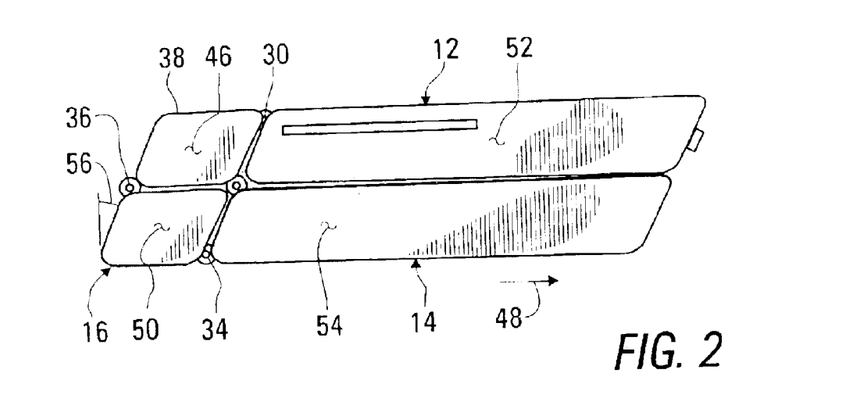
FIG. 2 is a left elevation of the portable computer of FIG. 1 in the closed condition.
Figure 3:
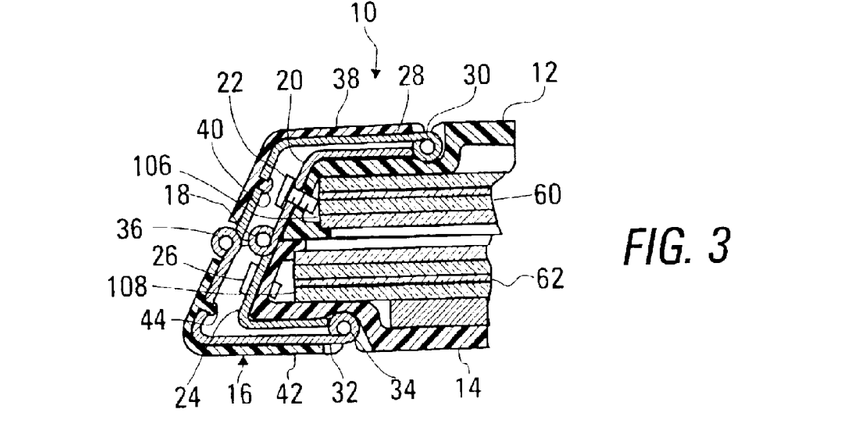
FIG. 3 is a cross-sectional view of the portable computer of FIG. 1 in the closed condition, taken as indicated by section lines III—III in FIG. 1.

FIGS. 1–3 show a portable computer 10 in a fully closed condition, in which it is particularly suitable for carrying in a pocket or purse, with display screens and control switches hidden from sight and thus unsusceptible to damage or to accidental operation to change settings of the computer 10. FIG. 1 is a perspective view of the computer 10, while FIG. 2 is a left end elevation thereof, and while FIG. 3 is a fragmentary cross-sectional view taken as shown by section lines III—III in FIG. 1.

The portable computer 10 includes an upper section 12 and a lower section 14, which are attached to pivot relative to one another by a hinge assembly 16 having an inner pivot pin 18, located near adjacent corners of the sections 12, 14. For example, the hinge assembly 16 includes an upper mounting bracket 20, attached to the upper section 12 by means of a number of mounting screws 22, and a lower mounting bracket 24, attached to the lower section 14 by means of a number of mounting screws 26. The hinge assembly 16 further includes an upper outer bracket 28, pivotally attached to the upper mounting bracket 20 at an upper pivot pin 30, and a lower outer bracket 32, pivotally attached to the lower mounting bracket 24 by a lower pivot pin 34. The outer brackets 28, 32 are in turn pivotally attached at an outer pivot pin 36. The hinge assembly 16 preferably additionally includes an upper cover 38, composed of a thermoplastic resin and fastened to the upper outer bracket 28 by a number of formed pins 40 extending inward as portions of the upper outer bracket 28, and a lower cover 42, similarly fastened to the lower outer bracket 32 by a number of formed pins 44. The pins 40, 44 may be formed to hold the cover 42 in place using a heated tool or an ultrasonic tool. The upper cover 38 includes, at each end, an end wall 46 extending downward and forward, in the direction of arrow 48. The lower cover 42 similarly includes, at each end, an end wall 50 extending upward and forward. The end walls 46, 50 and end walls 52 and 54 of the upper section 12 and the lower section 14, respectively are inclined at an angle 56, so that each of the end walls 46, 50, 52, and 54 is provided with a general shape of a parallelogram.

The pivot pins 18, 36, 30, 32 each form a pivot axis about which the various elements of the hinge assembly 16 are pivoted.

Figure 4:
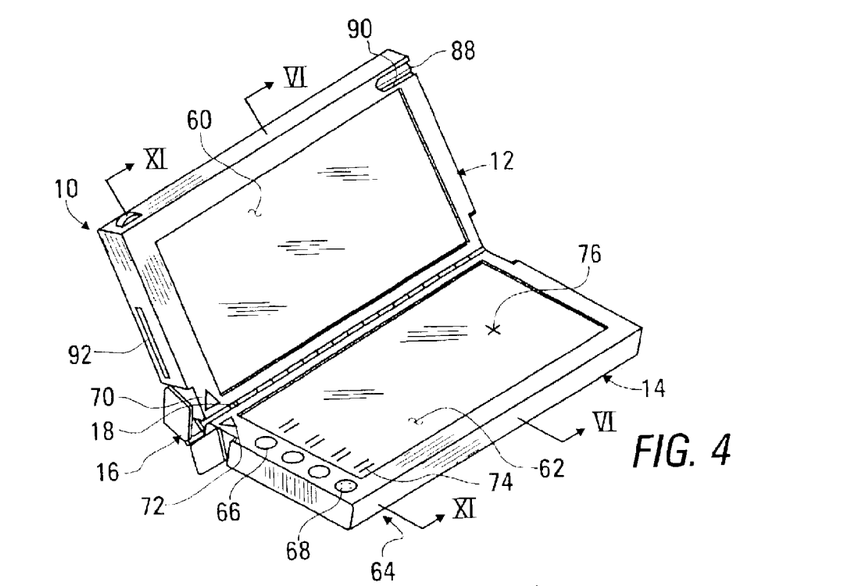
FIG. 4 is a perspective view of the portable computer of FIG. 1 in a partly open condition.
Figures 5, 6:
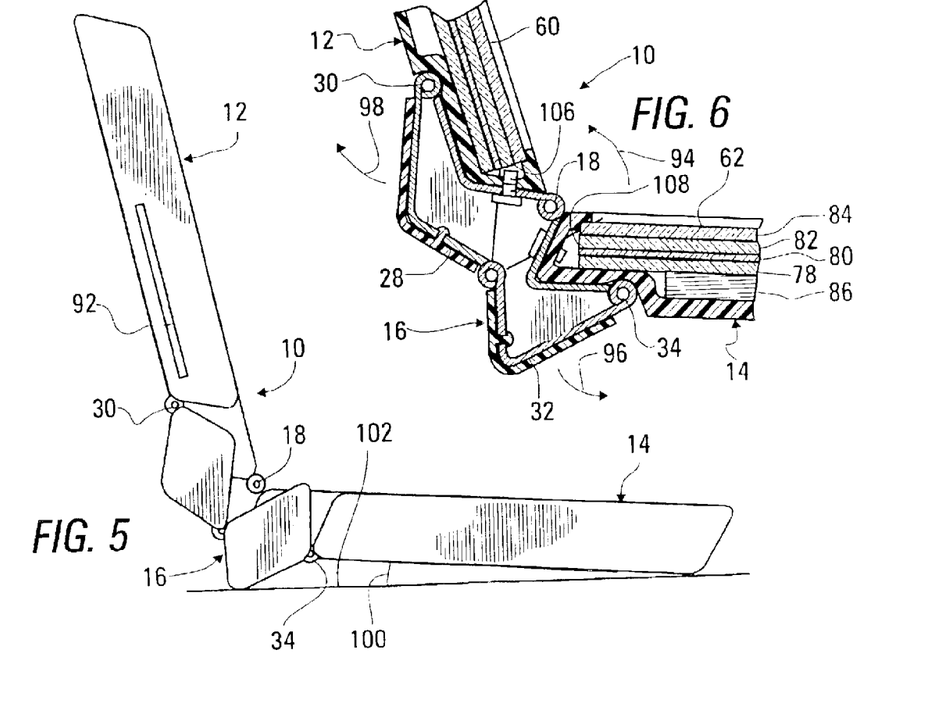
FIG. 5 is a left elevation of the portable computer of FIG. 1 in the partly open condition.
FIG. 6 is a cross-sectional view of the portable computer of FIG. 1 in the partly open condition, taken as indicated by section lines VII—VII in FIG. 4.

FIGS. 4–6 show the portable computer 10 in a partly open condition, in which it can be held for operation, with FIG. 4 being a perspective view thereof, with FIG. 5 left end elevation thereof, and with FIG. 6 being a fragmentary cross-sectional view taken as shown by section lines VI—VI in FIG. 4.

In this condition, an upper display screen 60, held within the upper housing 12, and a lower display screen 62, held within the lower housing 14, are both available for viewing. Various controls 64 are also available for use. These controls 64 include, for example, a number of programmable buttons 66, a cursor control 68, a forward button 70, and a back button 72. One of the programmable buttons 66 may be used to turn the computer 10 off and on. The programmable buttons 66 can be depressed to select functions indicated by text or symbols 74 displayed adjacent the buttons 66 by a program executing within the portable computer 10. The cursor control 68 is depressed at various locations around its periphery to move a displayed cursor 76 around either or both of the display screens 60, 62. The controls 64 may also include a scrolling wheel 69, which is used to scroll a document displayed on one or both of the display screens 60, 62 vertically from line to line.

Each of the display screens 60, 62 includes various conventional elements used to form visible images. For example, each of the display screens 60, 62 may include a florescent illuminated panel 78, a first polarizing filter 80, a layer 82 of liquid crystal cells, and a second polarizing filter 84. The layer 82 also has circuits applying electrical charges to the liquid crystal cells to vary the angle through which polarized light is twisted as it travels through the layer 82. The display screen 60, 62 may additionally have a filter layer (not shown) forming red, green, and blue, dots so that color images are produced.

In one version of the portable computer 10, the lower screen 62 is particularly adapted for use as an input device, with a digitizer pad 86 being included below the screen 62, and with a stylus 88 being removably held in a slot 90 within the computer 10. For example, the stylus 86 may include a battery-powered transmitter acting with circuits within the digitizer pad 86 to produce signals within the computer 10 in response to movement of the stylus 86 along the lower screen 62. A group of symbols, such as alphanumeric symbols in the form of a keyboard, may be displayed on the lower screen 62 to indicate the conditions at which desired inputs may be made.

The portable computer 10 may also include one or more slots 92 for the removable installation of auxiliary devices having terminals to be electrically connected with contacts (not shown) accessible within the slots 92. Such auxiliary devices may include a digital camera, additional memory circuits, or a wireless or wired network adapter card.

As the portable computer 10 is opened into the condition of FIGS. 4–6, with the upper section 12 being pivoted relative to the lower section 14 about the inner pivot pin 18 in the direction of arrow 94, the lower outer bracket 32 pivots downward from the lower section 14, in the direction of arrow 96, about the lower pivot pin 34. Additionally, the upper outer bracket 28 pivots rearward from the upper section 12, in the direction of arrow 98, about the upper pivot pin 30. In this way, the hinge assembly 16 is moved to bulge downward and rearward from the sections 12, 14, forming a handle by which the portable computer 10 is conveniently held in one hand without allowing the fingers of the hand holding the computer 10 to partly obscure the controls 64 and the display screens 60, 62. In this way, the computer 10 is easily held in one hand while the user is sifting, standing, or walking, with both the screens 60, 62 being viewed, and with the other hand being used to operate the controls 64.

As shown particularly in FIG. 5, this movement of the hinge assembly 16 also provides a surface allowing the portable computer 10 to rest at a convenient angle 100 on a horizontal surface 102, such as a tabletop.

Figure 7:
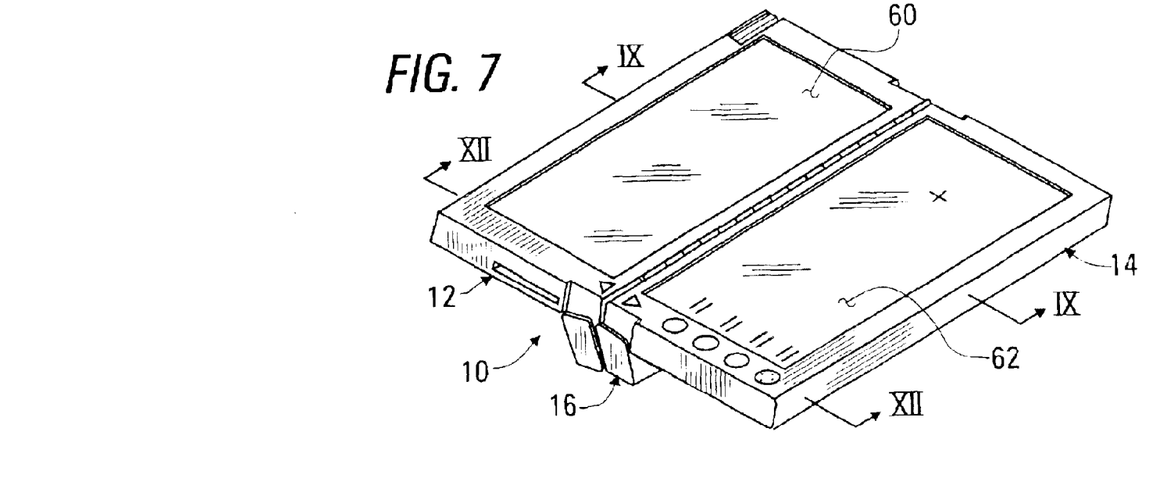
FIG. 7 is a perspective view of the portable computer of FIG. 1 in a fully open condition.
Figure 8:
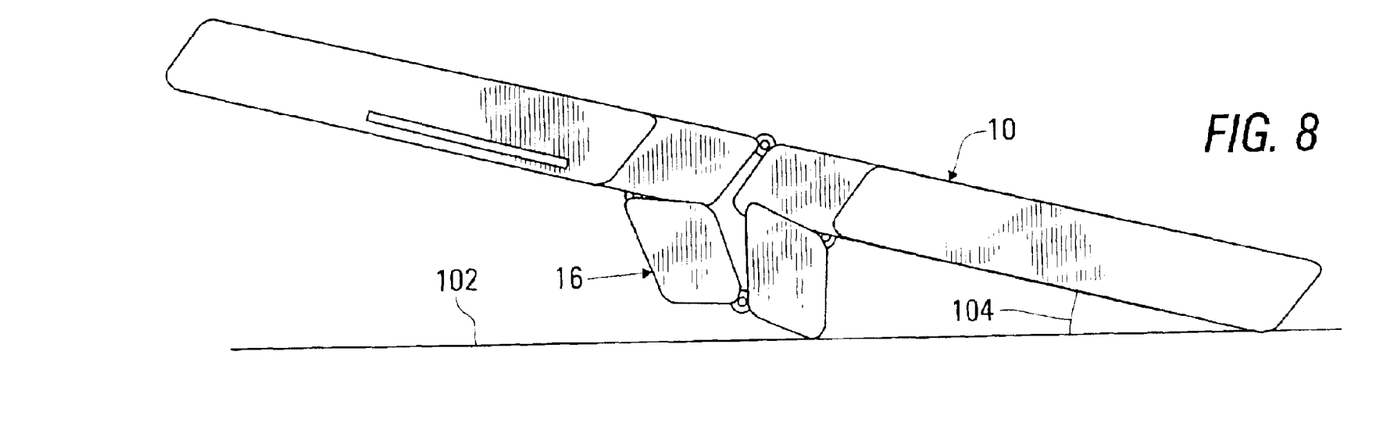
FIG. 8 is a left elevation of the portable computer of FIG. 1 in the fully open condition.
Figure 9:
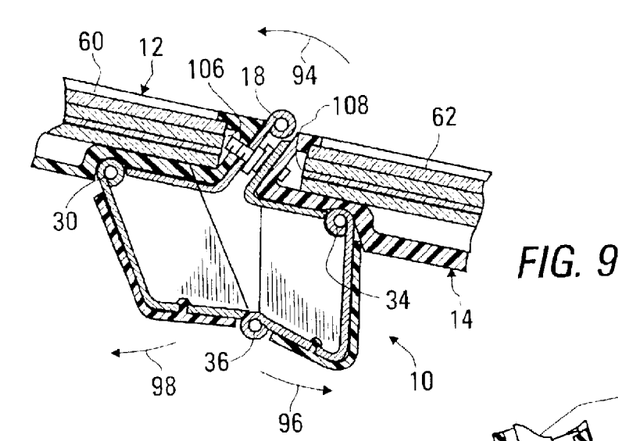
FIG. 9 is a fragmentary cross-sectional view of the portable computer of FIG. I in the fully open condition taken as indicated by section lines IX—IX in FIG. 7.

FIGS. 7–9 show the portable computer 10 in a fully open condition, in which it can be held for operation, with the display screens 60, 62 extending within a common plane. FIG. 7 is a perspective view of the portable computer 10, FIG. 8 is a right end elevation thereof, and FIG. 9 is a fragmentary cross-sectional view taken as shown by section lines IX—IX in FIG. 7.

As the portable computer 10 is opened into the condition of FIGS. 7–9, with the upper section 12 being pivoted further relative to the lower section 14 about the inner pivot pin 18 in the direction of arrow 94, the lower outer bracket 32 pivots downward and forward from the lower section 14, in the direction of arrow 96, about the lower pivot pin 34. Additionally, the upper outer bracket 28 pivots rearward from the upper section 12, in the direction of arrow 98, about the upper pivot pin 30. In this way, the hinge assembly 16 is moved to bulge downward from the sections 12, 14, forming a handle by which the portable computer 10 is conveniently held in one hand without allowing the fingers of the hand holding the computer 10 to partly obscure the controls 64 and the display screens 60, 62. In this way, the computer 10 is easily held in one hand while the user is sitting, standing, or walking, with both the screens 60, 62 being viewed, and with the other hand being used to operate the controls 64.

As shown particularly in FIG. 8, this movement of the hinge assembly 16 also provides a surface allowing the portable computer 10 to rest at a convenient angle 104 on a horizontal surface 102, such as a tabletop.

Thus, moving the portable computer 10 into a partly or fully open condition causes the hinge assembly 16 to move into a bulged condition, forming a convenient handle for holding the computer 10 with one hand during its operation, and additionally forming a surface for resting the computer 10 at a convenient angle on a horizontal surface. When the computer 10 is returned to its closed position, the hinge assembly is returned to a condition with all components disposed close to the adjacent the ends of the upper and lower sections 12, 14, taking up a minimum amount of space, as shown particularly in FIG. 3.

Referring to FIGS. 3, 6, and 9, the hinge assembly 16 provides a cover protecting the adjacent edges 106, 108 of the display screens 60, 62, respectively, whether the portable computer 10 is closed or open.

Figure 10:
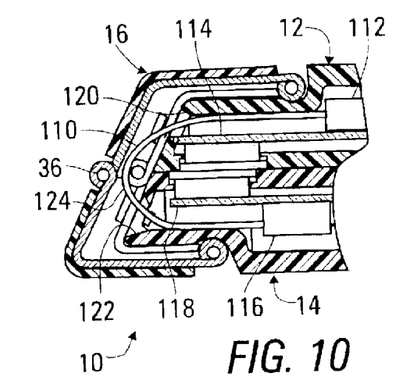
FIG. 10 is a fragmentary cross-sectional view of the portable computer of FIG. 1 in the closed condition, taken as indicated by section lines X—X in FIG. 1 to show a cable connection therein.
Figure 11:
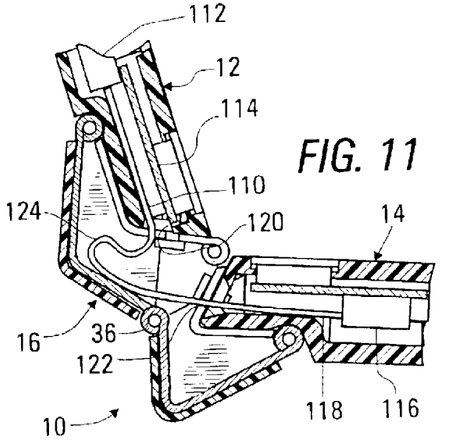
FIG. 11 is a fragmentary sectional view of the portable computer of FIG. 1 in the partly open condition, taken as indicated by section lines XI—XI in FIG. 4 to show the cable connection therein.
Figure 12:
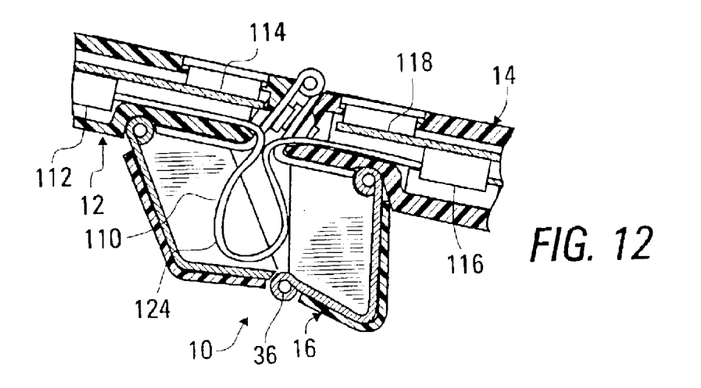
FIG. 12 is a fragmentary sectional view of the portable computer of FIG. 1 in the fully open condition, taken as indicated by section lines XII—XII in FIG. 7 to show the cable connection therein.

FIGS. 10–12 are fragmentary cross-sectional views of the portable computer 10, with being taken as indicated by section lines X—X in FIG. 1 to show the computer 10 in its closed condition, with FIG. 11 being taken as indicated by section lines XI—XI in FIG. 4 to show the computer 10 in its partly open condition, and with FIG. 12 being taken as indicated by section lines XII—XII in FIG. 7 to show the computer 10 in its fully open condition.

In accordance with a preferred version of the invention, electrical circuits within the sections 12, 14 are connected by a flexible cable 110, which remains connected with various circuits within both the upper section 12 and the lower section 14 as the computer 10 is moved between its closed and fully open conditions. For example, the flexible cable 110 extends between an upper connector 112, through which a number of connections are made with electrical circuits extending within an upper circuit board 114, and a lower connector 116, through which a number of connections are made with electrical circuits extending within a lower circuit board 118. The circuit boards 114, 118 include connections to circuits applying electrical charges within the liquid crystal layers 82 of the upper and lower display screens 60, 62, to the digitizer pad 86, to the controls 64, and to various conventional computer circuit elements (not shown), such as a microprocessor controllers, and memory circuits.

The screws 22 fastening the hinge assembly 16 into the upper section 12 are offset along the length of the portable computer 10 from the screws 24 fastening the hinge assembly 16 to the lower section 14, allowing the computer 10 to be brought into the fully open condition of FIGS. 7–9 and 12 without contact between the heads of these screws 22, 24. Preferably, the hinge assembly 16 is fastened to these sections 12, 14 before the outer hinge pin 36 is installed within the hinge assembly 16, so that access is readily achieved to the locations of the screws 22, 24 for their installation.

The flexible cable 110 extends outward through an upper slot 120 in the upper section 12 and through a lower slot 122 in the lower section 14. As the computer 10 is moved from the closed condition of FIG. 10 to the partly open condition of FIG. 11, and then to the fully open condition of FIG. 12, these slots 120, 122 are moved closer together, causing the portion 124 of the flexible cable 110 to extend farther outward from the slots 120, 122 as a loop. Since such movement of the computing system 10 additionally causes the hinge assembly 16 to bulge outward, providing a space in which the cable portion 124 is held and protected from being snagged or pulled by an object external to the portable computer 10.

Figure 13:
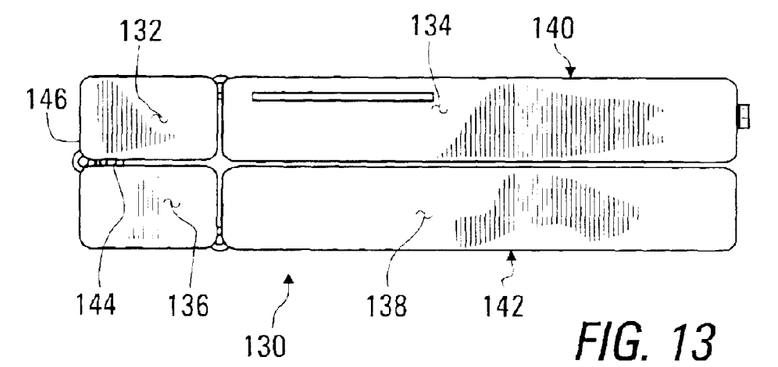
FIG. 13 is a left elevation of a portable computer built in accordance with an alternative version of the invention.
Figure 14:
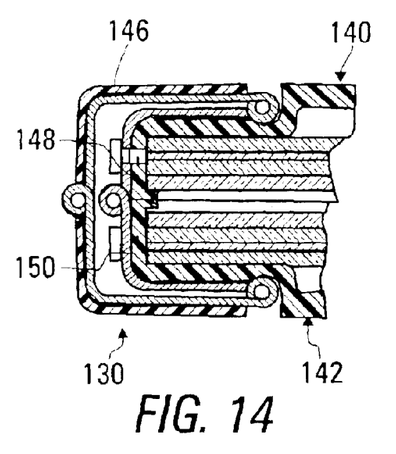
FIG. 14 is a fragmentary cross-sectional view of the portable computer of FIG. 13 in a closed condition.
Figure 15:
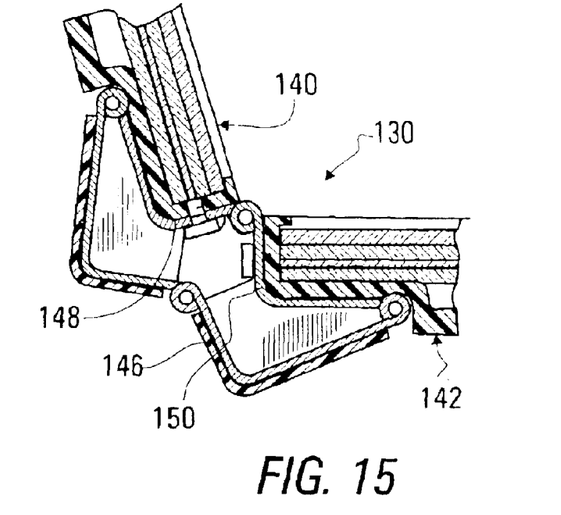
FIG. 15 is a fragmentary cross-sectional view of the portable computer of FIG. 13 in a partly open condition.
Figure 16:
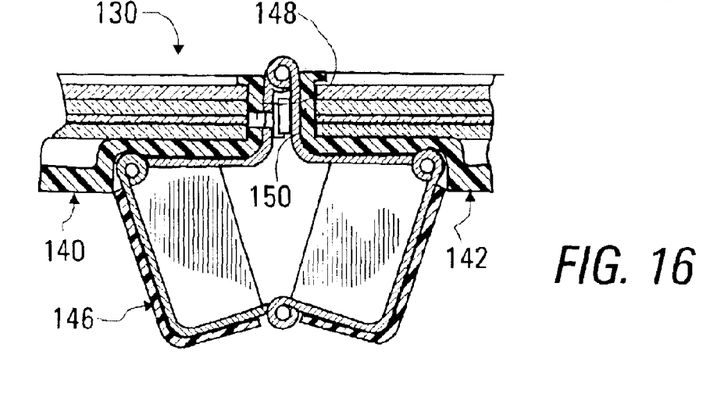
FIG. 16 is a fragmentary cross-sectional view of the portable computer of FIG. 13 in a fully open condition.

FIGS. 13–16 show a portable computer 130 built in accordance with an alternative version of the invention. FIG. 13 is a left elevation of the portable computer 130, while FIGS. 14–16 are fragmentary cross-sectional views thereof, with FIG. 14 showing the portable computer 130 in a closed condition, with FIG. 15 showing the computer 130 in a partly open condition, and with FIG. 16 showing the computer 130 in a fully open condition.

The portable computer 130 is similar to the portable computer 10, described above in reference to FIGS. 1–12, except that the inclination of edge surfaces through an angle 56, as shown in FIG. 1, has been eliminated, so that each of the end walls 132, 134, 136, 138 of the portable computer 130 is essentially rectangular. Other aspects of the portable computer are as described above in reference to FIGS. 1–12, with an upper section 140 being pivotally attached to a lower section 142 at a hinge pivot 144, and with a hinge assembly 146 being attached to extend around ends 148, 150 of the sections 140, 142.

While the invention has been described in its preferred versions with some degree of particularity, it is understood that this description has been given only by way of example, and that many changes may be made in the arrangement of parts without departing from the scope and spirit of the invention, as described in the appended claims.

What is claimed is:

1. A portable computer comprising:
   a lower section;
   an upper section, pivotally mounted on said lower section about a first pivot axis extending along said portable computer adjacent a lower rear edge of said upper section to be pivotable between a closed position, wherein said upper section extends adjacent and above said lower section, and an open position, wherein said upper section extends away from said lower section;
   an upper outer bracket, pivotally mounted on said upper section to extend along an upper surface of said upper section and to extend downward along a rear surface of said upper section with said upper section in said closed position;
   a lower outer bracket, pivotally mounted on said lower section to extend along a lower surface of said lower section and to extend upward along a rear surface of said lower section with said upper section in said closed position, wherein said lower outer bracket is additionally pivotally mounted to said upper outer bracket.

2. The portable computer of claim 1, wherein said upper and lower outer brackets pivot away from adjacent surfaces of said upper and lower sections as said upper section is moved from said closed position to said open position.

3. The portable computer of claim 2, wherein
   said upper outer bracket is pivotally mounted on said upper section along a second pivot axis extending parallel to said first pivot axis,
   said lower outer bracket is pivotally mounted on said lower section along a third pivot axis extending parallel to said first pivot axis, and
   said lower outer bracket is pivotally mounted on said upper outer bracket along a fourth pivot axis extending parallel to said first pivot axis.

4. The portable computer of claim 3, wherein said upper outer bracket has an end wall extending downward and outwardly adjacent said upper section at each end of said upper outer bracket.

5. The portable computer of claim 4, wherein said lower outer bracket has an end wall extending upward and outward adjacent said lower section at each end of said lower outer bracket.

6. The portable computer of claim 5, wherein
   said upper and lower sections each include upper and lower surfaces extending parallel to one another and a rear surface inclined downward from said upper surface at an acute angle, and
   each of said end walls is shaped essentially as a parallelogram having adjacent sides extending from one another at said acute angle.

7. The portable computer of claim 5, wherein
   said upper and lower sections each include upper and lower surfaces extending parallel to one another and a rear surface extending downward from said upper surface perpendicular to said upper surface, and
   each of said end walls is shaped essentially as a rectangle.

8. The portable computer of claim 5, wherein said upper outer bracket includes:
   an inner portion extending forward to form a portion of a hinge along said second pivot axis and extending downward to form a portion of a hinge along said fourth pivot axis,
   an outer portion disposed outwardly from said inner portion and attached thereto, including said end walls of said upper outer bracket.

9. The portable computer of claim 8, wherein said lower outer bracket includes:
   an inner portion extending forward to form a portion of a hinge along said third pivot axis and extending upward to form a portion of said hinge along said fourth pivot axis,
   an outer portion disposed outwardly from said inner portion and attached thereto, including said end walls of said lower outer bracket.

10. The portable computer of claim 9, additionally comprising:
    an upper mounting bracket, attached to said upper section, extending forward to form a portion of said hinge along said second pivot axis and downward to form a portion of said hinge along said first pivot axis; and
    a lower mounting bracket, attached to said lower section, extending forward to form a portion of said hinge along said third pivot axis and upward to form a portion of said hinge along said first pivot axis.

11. The portable computer of claim 3, additionally comprising a flexible electrical cable extending between circuits within said upper section and circuits within said lower section, wherein a portion of said flexible electrical cable extends within a space between inner surfaces of said upper and lower outer brackets and outer surfaces of said upper and lower sections.

12. The portable computer of claim 3, additionally comprising:
    an upper display screen facing downward within said upper section in said closed position; and
    a lower display screen facing upward within said lower section.

13. The portable computer of claim 7, additionally comprising
- a digitizer tablet extending under said lower display screen; and
- a stylus movable along said lower display screen, wherein said digitizer tablet produces a signal indicating positions of said stylus as said stylus is moved along said lower display screen.

14. A hinge assembly for pivotably connecting upper and lower sections of a portable computer, comprising:
- an upper mounting bracket for attachment to said upper section, extending forward to form a portion of a hinge along an upper pivot axis and downward to form a portion of a hinge along an inner pivot axis;
- a lower mounting bracket for attachment to said lower section, extending forward to form a portion of a hinge along a lower pivot axis and upward to form a portion of a hinge along said inner pivot axis;
- an upper outer bracket, extending, outwardly from said upper mounting bracket, forward to form a portion of said hinge along said upper pivot axis and downward to form a portion of a hinge along an outer pivot axis;
- a lower outer bracket, extending outwardly from said lower mounting bracket, forward to form a portion of said hinge along said lower pivot axis and upward to form a portion of said hinge along said outer pivot axis, wherein all said pivot axes are parallel; and
- pivot pins extending within said hinges along said inner, upper, and lower pivot axes.

15. The hinge assembly of claim 14, additionally comprising a pivot pin extending within said hinge along said outer pivot axis.

16. The hinge assembly of claim 14, additionally comprising:
- an upper hinge cover attached to said upper outer bracket to extend outwardly from said upper outer bracket, wherein said upper hinge cover includes an end wall extending downward and forward at each end of said upper hinge cover; and
- a lower hinge cover attached to said lower outer bracket to extend outwardly from said lower outer bracket, wherein said lower hinge cover includes an end wall extending upward and forward at each end of said upper hinge cover.

17. The hinge assembly of claim 16, wherein
said upper mounting bracket and said upper outer bracket extend downward at an acute angle of inclination,
said lower mounting bracket and said lower outer bracket extend upward at said acute angle of inclination,
said end walls are shaped essentially as parallelograms, with edges extending downward at said acute angle of inclination.

18. The hinge assembly of claim 16, wherein
said upper mounting bracket and said upper outer bracket extend straight downward,
said lower mounting bracket and said lower outer bracket extend straight upward, and
said end walls are essentially rectangular in shape.

* * * * *